United States Patent
Blok et al.

(10) Patent No.: US 6,300,421 B1
(45) Date of Patent: Oct. 9, 2001

(54) PREPARATION OF PEROXIDE VULCANIZED RUBBER COMPOSITION AND ARTICLES HAVING AT LEAST ONE COMPONENT THEREOF

(75) Inventors: Edward John Blok, Wadsworth; Mark Leslie Kralevich, Jr., Copley; Paul Harry Sandstrom, Tallmadge; Larry Ashley Gordon; James Edward Taucher, both of Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/262,173

(22) Filed: Mar. 4, 1999

(51) Int. Cl.[7] .................. C08F 8/34; C08F 19/20
(52) U.S. Cl. .................. 525/331.1; 525/332.5; 525/332.6; 525/391; 525/333.1; 525/333.3; 525/333.5; 525/341; 525/345; 525/354

(58) Field of Search ............... 525/326.3, 329.3, 525/332.1, 332.5, 332.6, 391, 332.9, 333.1, 333.3, 333.5, 341, 345, 354, 331.9; 524/500, 505, 515, 524, 526, 534

(56) References Cited

U.S. PATENT DOCUMENTS 5,310,811 * 5/1994 Cottman et al. .................. 525/305

FOREIGN PATENT DOCUMENTS

| 0344380 | 10/1988 | (EP) | C08L/21/00 |
| 0 344 380 | * 12/1989 | (EP) | . |
| 0754726 | 5/1990 | (EP) | C08L/23/02 |
| 0504920 | 3/1992 | (EP) | C08J/3/24 |

* cited by examiner

*Primary Examiner*—David W. Wu
*Assistant Examiner*—R. Harlan

(57) ABSTRACT

The invention relates to preparation of EPDM-based and EPR-based rubber compositions which are vulcanized with peroxide together with a specified combination of sulfur and acrylate co-agents. The invention further relates to articles having at least one component thereof.

57 Claims, No Drawings

PREPARATION OF PEROXIDE VULCANIZED RUBBER COMPOSITION AND ARTICLES HAVING AT LEAST ONE COMPONENT THEREOF

FIELD

The invention relates to EPDM and EPR-based rubber compositions which are vulcanized with peroxide together with a specified combination of sulfur and acrylate co-agents. The invention further relates to articles having at least one component thereof.

BACKGROUND

Various industrial products are prepared which have at least one component as a rubber composition which is based upon an EPDM or EPR rubber.

It is sometimes desired to improve the cure efficiency for peroxide curing of an EPDM-based, or EPR-based rubber composition, namely providing a faster cure system for a reduction in cure time, commensurate with a suitable processing safety, or processing without generating scorched rubber.

In practice, EPDM (ethylene/propylene/non-conjugated diene terpolymer elastomers) based rubber compositions, as well as rubbery ethylene/propylene polymer (EPR) based rubber compositions, are often cured (vulcanized) with peroxide curatives and sometimes with a combination of peroxide and a co-agent such as, for example, sulfur or acrylate co-agent.

However, it is not seen where a combination of sulfur and acrylate co-agents have contemplated for peroxide curing of EPDM or EPR elastomers.

It is to be appreciated that peroxide curatives generate free radicals for the EPDM or EPR, as the case may be, curing process which serve to crosslink the EPDM or EPR with carbon-to-carbon crosslinks. Some peroxide curatives promote faster curing of EPDM and EPR rubbers than others.

For peroxide curing of EPDM and EPR rubbers, free radicals formed during its peroxide-based curing is typically accompanied by a small amount of side reactions such as, for example, beta scission of a portion of the rubber itself which reduces the molecular weight of the polymer, and tends to degrade physical properties.

In order to minimize, or retard, the effects of such side reactions, a co-agent may be used in combination with the peroxide curative to react with the free radicals formed during the curing process and to stabilize the said radicals. In this manner, a co-agent tends to improve the overall crosslinking efficiency, thereby leading to higher cure rate and state of cure. This is well known to those having skill in such art.

Processing safety, for the purposes of this invention, relates to the processing of a rubber composition with conventional rubber mixing apparatus up to temperatures of about 130° C., or sometimes even up to about 150° C., for reasonable periods of time without appreciably scorching the rubber composition itself. The term "scorching" relates to prematurely curing the rubber composition while it is being mixed, or processed, in the aforesaid rubber mixer, particularly in an internal rubber mixer. The undesirable aspect of scorching, or pre-curing, of rubber during its mixing in an internal rubber mixer is well known to those having skill in such art.

Accordingly, peroxide curatives for EPDM and EPR rubbers are often selected according to their decomposition rate, namely their rate of forming free radicals during the curing of an EPDM or EPR.

For example, product manufacturing operations that desire relatively fast curing times, or relatively short molding times, typically use peroxide curatives with a relatively short half-life such as, for example, diacyl peroxides, although such peroxides may have a reduced processing safety, or a greater tendency to result in a scorched rubber composition.

On the other hand, peroxide curatives that typically exhibit slower curing times for curing EPDM's and EPM's, such as for example, di-tert-alkyl peroxides, usually exhibit good process safety, or resistance to scorching of the EPDM, or EPR, as the case may be, yet require relatively long cure times.

A philosophy of selection of peroxide curatives to balance curing speed with elimination of at least reduction of scorching of EPDM and EPR rubber compositions is well known to those having skill in such art.

In practice, sulfur is sometimes used as a co-agent for peroxide curing of EPDM's and EPR's, as is well known to those having skill in such art.

Other co-agents sometimes used as additives for peroxide-based cure systems for rubber compositions are typically polyfunctional chemicals that react readily with free radicals which are generated by the peroxide cure system. Such reaction by a co-agent tends to reduce the side reactions of free radicals generated by the peroxide curative during the curing of the EPDM rubber, including chain scission of the rubber itself. In practice, such co-agents are basically used to improve both the cure rate and the state of cure of the rubber composition.

Examples of use of sulfur and various co-agents in peroxide curing of polymers may be found, for example, in *Rubber Chem. and Tech.*, vol 61, page 238 (1988) by R. C. Keller.

In one aspect of this invention, it is desired to provide a method for appreciably increasing a cure rate for an EPDM-based or EPM-based rubber composition while substantially retaining, or even improving, its processability, or scorch safety.

In the description of this invention, the term "phr" as used herein, and according to conventional practice, refers to parts of a respective material per 100 parts by weight of rubber. In the description herein, rubber and elastomer are used interchangeably unless otherwise noted. The terms "cure", "vulcanized" and "crosslinked" also used interchangeably unless otherwise noted. Further, the terms "uncured", "unvulcanized" and "uncrosslinked" are used interchangeably to refer to a rubber composition which has not been cured, vulcanized or crosslinked" unless otherwise noted.

SUMMARY AND PRACTICE OF THE INVENTION

In accordance with this invention, a process is provided which comprises blending an EPDM-based and/or EPR-based rubber composition with a peroxide curative together with a combination of sulfur and acrylate co-curing agents, followed by peroxide curing the rubber composition at an elevated temperature.

In particular, a process of preparing a composition is provided which comprises (A) blending, preferably at a temperature in a range of about 100° C. to about 130° C. and based upon 100 phr of elastomer;

(1) about 10 to about 100, preferably about 100, and alternately about 40 to about 80, phr of at least one low unsaturation rubber or saturated rubber selected from EPDM and EPR and about zero to about 90, preferably zero and alternately about 20 to about 60, phr of at least one high unsaturation rubber selected from homopolymers and copolymers of conjugated dienes and copolymers of at least one conjugated diene with a vinyl aromatic compound selected from styrene and alpha-methylstyrene;

(2) about 20 to about 200, alternately about 90 to about 110, phr of particulate reinforcement selected from at least one of clay, carbon black and precipitated silica, preferably clay and/or silica with only a minor amount, if any, of carbon black;

(3) about 0.5 to about 10, alternatively about 2 to about 6, phr of peroxide curative for said low unsaturation rubber(s);

(4) about 0.25 to about 10, alternately about 1.5 to about 5.5, phr of acrylate co-curing agent which is homogeneously dispersed within said elastomer(s), wherein said acrylate is selected from at least one of monoacrylate, diacrylate, triacrylate, tetraacrylate, pentaacrylate and hexaacrylate co-curing agents for peroxide curative, and mixtures thereof; and (5) about 0.05 to about 0.6, alternatively about 0.2 to about 0.4, phr of elemental sulfur co-curing agent; wherein the weight ratio of said sulfur and acrylate co-curing agents to said peroxide curative is in a range of about 1/1 to about 1/30 and the weight ratio of said acrylate co-curing agent to said sulfur co-curing agent is in a range of about 2/1 to about 200/1, followed by (B) heating and curing the prepared composition at a temperature in a range of about 150° C. to about 180° C.

Thus, it is required that the acrylate co-curing agent is clearly in the majority of the sulfur and acrylate co-curing agents.

In further accordance with this invention, an article is provided having at least one component which prepared by such process.

In additional accordance with this invention, said article is an industrial article of manufacture.

In particular, said industrial article of manufacture may be selected from at least one of belt, hose, seals, gaskets and electrical devices.

In additional accordance with this invention, an uncured EPDM-based and/or EPR-based rubber composition is provided which is comprised of, based upon 100 phr of elastomer(s):

(1) 100 parts by weight (phr) of uncrosslinked elastomer(s) comprised of (a) about 10 to about 100, preferably about 100 and alternatively about 20 to about 60, phr of low unsaturation rubbers selected from at least one of EPDM rubber and EPM rubber and (b) about zero to about 90, preferably zero and alternatively 40 to about 80, phr of at least one diene-based rubber selected from homopolymers and copolymers of conjugated dienes and copolymers of at least one conjugated diene with a vinyl aromatic compound selected from styrene and alpha-methylstyrene;

(2) about 20 to about 200, alternatively about 90 to about 110, phr of particulate reinforcement selected from at least one of clay, carbon black and precipitated silica, preferably clay and/or silica with a minor portion, if any, of carbon black;

(3) from about 0.5 to about 10, alternatively about 2 to about 6, phr of at least one peroxide curative for said EPDM and EPR;

(4) from about 0.25 to about 6, alternatively about 1.5 to about 3.5, phr of an acrylate compound as a co-curing agent which is homogeneously dispersed within said elastomer(s); wherein said acrylate is selected from at least one of monoacrylate, diacrylate, triacrylate, tetraacrylate, pentaacrylate and hexaacrylate co-curing agents for peroxide curative, and mixtures thereof; and (5) from about 0.05 to about 0.6, alternatively about 0.2 to about 0.4, phr of elemental sulfur co-cure agent; wherein the weight ratio of said sulfur and acrylate co-curing agents to said peroxide curative is in a range of about 1/1 to about 1/30 and the weight ratio of acrylate co-curing agent to said sulfur co-curing agent is an a range of about 2/1 to about 200/1.

The uncured composition is typically cured by heating to an elevated temperature, usually in a suitable mold and typically at a temperature in a range of about 150° C. to about 180° C.

In further accordance with this invention, an article is provided having at least one component of such cured composition.

In additional accordance with this invention, said article is an industrial article of manufacture.

In particular, said industrial article of manufacture may be selected from at least one of belt, hose, seals, gaskets and electrical devices.

In one aspect of this invention, preferably the low unsaturation elastomer is EPDM to the exclusion of EPR.

In another aspect of this invention, preferably the low unsaturation elastomer is EPR to the exclusion of EPDM.

Peroxide curatives are used to generate free radicals which in turn crosslink certain elastomers and particularly EPDM's and EPR's.

Representative of such peroxide curative compounds are, for example, diacyl peroxides, acetyl alkylsulfonyl peroxdides, dialkyl peroxydicarbonates, tere-alkuyl peroxyesters, α,α'-(tert-alkylperoxy)ketals, dialkyl perioxides, di-tert-aklyl peroxides and tert-alkyl hydroperoxides.

Representative examples of dialklyl peroxide curatives are dicumyl peroxide and 2,5-dimethyl-2,5-di(t-butyl-peroxy)hexane.

Representative examples of diacyl peroxide curatives are dibenzoyl peroxide and 2,4-dichlorobenzyl peroxide.

Preferred peroxide curatives are dicumyl peroxide and 2,5-dimethyl-2,5-di(t-butyl-peroxy)hexane, as well as α,α'-bis(t-butylperoxy)-diisopropylbenzene.

It is a significant feature of this invention that the acrylate co-curing agent is used in combination with an elemental sulfur co-curing agent.

Representative of contemplated monoacrylate co-curing agents are, for example, stearyl acrylate, stearyl methacrylate, lauryl acrylate, lauryl methacrylate and isodecyl methacrylate.

Representative of contemplated diacrylate co-curing agents are, for example, 1,4-butanediol diacrylate, 1,4-butanediol dimethacrylate, tetraethylene glycol diacrylate, ethoxylated Bisphenol-A diacrylate and ethoxylated Bisphenol-A dimethacrylate.

Representative of contemplated triacrylate co-curing agents are, for example, trimethyl propane triacrylate, trimethyl propane trimethacrylate, glycerol triacrylate, glycerol trimethacrylate, trimethyl ethane triacrylate, propoxylated glycerol triacrylate and ethoxylated trimetholpropane triacrylate.

Representative of contemplated tetraacrylate co-curing agents are, for example, pentaerythreitol tetraacrylate, pentaerythritol tetramethacrylate, di-trimethylolpropane tertraacrylate and ethoxylated pentaerythritol tetraacrylate.

Representative of contemplated pentaacrylate co-curing agents are, for example, dipentaerythritol pentaacrylate and pentaacrylate ester.

The EPDM and EPR rubbers are EPDM and EPR rubbers in a conventional sense. Therefore, the EPDM rubber is a terpolymer of ethylene, propylene and a small, or minor, amount of non-conjugated diene. The EPR rubber (which might be sometimes referred to as an "EPM" rubber) is a copolymer of ethylene and propylene. Accordingly, the EPDM is conventionally thought of as a relatively low unsaturation rubber (low carbon-to-carbon double bond unsaturation). Usually, such low unsaturation EPDM rubber is comprised of from about 45 to abut 75 weight percent units derived from ethylene, from about 25 to about 55 weight percent units derived from propylene and from about one to about 15, more usually about 3 to about 7 weight percent units derived from the non-conjugated diene. Such non-conjugated dienes are conventionally selected from, for example, hexadiene, dicyclopentadiene and ethylidene norbornene such as, for example, 5-ethylidene-2-norbornene.

The uncrosslinked, high unsaturation (carbon-to-carbon double bond), diene-based, elastomers contemplated are homopolymers and copolymers of conjugated diene hydrocarbons and copolymers of conjugated dienes and aromatic vinyl compounds such as, for example, styrene and alpha-methylstyrene. Representative of various dienes are, for example, isoprene and butadiene. Representative of various elastomers are, for example, cis 1,4-polyisoprene natural rubber, synthetic cis 1,4-polyisoprene, cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

Preferred high unsaturation elastomers, if used, are cis 1,4-polyisoprene, cis 1,4-polybutadiene and styrene/butadiene (emulsion and solution polymerization derived).

The prepared EPDM-based, or EPR-based, uncrosslinked rubber composition, which contains the peroxide curative together with a combination of sulfur and acrylate co-agents, may then be used to build an industrial product such as, for example, industrial belts, hoses, seals, gaskets and various electrical devices.

The resulting product may then be peroxide-cured in a suitable mold at a temperature in a range of about 125° C. to about 180° C., and usually from about 135° C. to about 160° C. for a suitable period of time such as, for example, from about 15 to about 20 minutes.

The mixing of the EPDM-based and EPR-based rubber compositions may be accomplished by methods known to those having skill in such art. For example, the ingredients may be mixed in internal rubber mixers at least two sequential stages, namely at lease one non-productive mixing stage without the curatives followed by a productive mixing stage where curatives are added where the mixing is conducted at a temperature (e.g.: 110–120° C.) lower than that of the productive mixing stages (e.g.: 150–170° C.). Such mixing process is well known to those having skill in such art.

For the practice of this invention, while peroxide curative and sulfur co-agent are to be added in the final, productive mixing stage, the acrylate co-agent may be added in either a non-productive mixing stage or a productive mixing stage.

As hereinbefore discussed, reinforcing fillers may be clay, silica and/or carbon black with the carbon black being a minor portion of such filler if the carbon black is used. Accordingly silica and clay, often particularly clay, may be preferred.

Clay, in general, may often be referred to as a "hydrated aluminum silicate". A known form of natural clay is, for example, Kaolinite. Natural clays are well known to those having skill in such art. Often Kaolinite is preferred.

Silica may be precipitated silica or pyrogenic silica. Precipitated silica is usually preferred.

Precipitated silicas such as, for example, those obtained by forming a soluble sodium silicate from a silicon dioxide (e.g.: via sodium hydroxide) followed by subsequent precipitation via addition of a suitable base (e.g.: sodium hydroxide).

Various commercially available silicas may be considered for use in this invention such as, for example, only and without limitation, silicas commercially available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, and BV3370GR and from J. M. Huber as Zeopol 8746.

Often a coupling agent is used with the silica and/or clay to enhance a reinforcing effect for the silica and/or clay, as the case may be, to the elastomer(s).

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in-situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and, thereby, enhances the rubber reinforcement aspect of the silica.

In one aspect, the silane of the coupling agent apparently forms a bond to the silica surface, possibly through hydrolysis, and the rubber interactive component of the coupling agent combines with the rubber itself.

Numerous coupling agents are taught for use in combining silica and rubber such as, for example, silane coupling agents containing a polysulfide component, or structure, such as, for example, bis(3-trialkoxysilylalkyl)polysulfides containing from 2 to about 8 connecting sulfur atoms in the sulfidic bridge representative of which is, for example, bis(3-triethoxysilylpropyl)polysulfide containing an average of about 3.5 to about 4 connecting sulfur atoms in its sulfidic bridge which is sometimes referred to as a "tetrasulfide".

It is readily understood by those having skill in the art that the EPDM and EPR rubbers may be compounded by methods generally known in the rubber compounding art such as mixing with various commonly used additive materials such as, for example, the aforesaid combination of sulfur and acrylate co-agents, and peroxide curatives as well as various vulcanization activators, retarders and accelerators, processing additives, such as oils, resins including tackifying resins, reinforcing fillers as hereinbefore discussed, and plasticizers, pigments, fatty acid, zinc oxide, waxes, antioxidants and antiozonants, and peptizing agents. As known to those skilled in the art, depending on the intended use of the EPDM-based peroxide and sulfur-vulcanizable rubber compositions, the additives mentioned above are selected and commonly used in conventional amounts.

Typical additions of carbon black clay and silica reinforcing fillers for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 7 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization, or curing is conducted in the presence of peroxide and combination of sulfur and acrylate co-agents as hereinbefore discussed, although the presence and relative amounts of the above additional additives are not considered, in general, to be an aspect of the present invention which is more primarily directed to the preparation of an EPDM-based rubber composition which contains peroxide curative together with a specified combination of sulfur and acrylate co-curing agents.

The invention may be better understood by reference to the following examples in which the parts and percentages are by weight unless otherwise indicated.

EXAMPLE I

Samples of EPDM-based elastomer compositions are prepared and identified herein as Samples A, B, C and D.

Samples A is a Control Sample in which a peroxide curative is used.

Samples C and D are Control Samples which individually contain a peroxide with either sulfur co-agent (Sample B) or acrylate co-agent (Sample C).

Sample D contains a peroxide curative together with a combination of sulfur and acrylate co-agents and is intended to be representative of this invention.

The Samples are prepared in a two-stage, sequential, mixing process in an internal rubber mixer, namely a first, non productive mixing stage followed by a productive mixing stage.

The elastomers and compounding ingredients, exclusive of the peroxide curing agent as well as the sulfur and acrylate co-curing agents, are added in the first, non-productive mixing stage where the mixing is conducted for about three minutes to a temperature of about 140° C.

The peroxide and, where appropriate, sulfur and/or acrylate co-agents, as the case may be, are then added in the productive mixing stage for about four minutes to a temperature of about 104° C.

The amounts of various ingredients used are shown in the following Table 1.

TABLE 1

| Ingredients | Sample A Control | Sample B Control | Sample C Control | Sample D |
|---|---|---|---|---|
| EPDM[1] | 100 | 100 | 100 | 100 |
| Clay[2] | 150 | 150 | 150 | 150 |
| Oil[3] | 35 | 35 | 35 | 35 |
| Carbon black[4] | 2 | 2 | 2 | 2 |
| Zinc oxide | 5 | 5 | 5 | 5 |
| Microcrystalline Wax | 1 | 1 | 1 | 1 |
| Acrylate co-agent[5] | 0 | 0 | 1.5 | 1.5 |
| Peroxide No. 1[6] | 3.5 | 3.5 | 3.5 | 3.5 |
| Peroxide No. 1[7] | 2.8 | 2.8 | 2.8 | 2.8 |
| Elemental sulfur | 0 | 0.3 | 0 | 0.3 |

[1]EPDM as Nordel 4640 from du Pont Dow Elastomers and Co. as a terpolymer rubber of ethylene, propylene and 5-ethylidene-2-norborene (FNB) conjugated diene having a Tg of about −45° C. composed of about 4.5 percent units derived from said norbornene and about 55 percent units derived from ethylene.
[2]Kaolin clay as Translink 37 from the Englehard company.
[3]Paraffinic rubber processing oil, ASTM D2226, Thpe 104B as Sunpar 2280 from R. E. Carroll company.
[4]N299.
[5]Trimethlolpropane trimethacrylate as SR350 from the Santomer company.
[6]Dicumyl peroxide as Dicup 40KE from Hercules Inc.
[7]2,5-dimethyl-2,5-di(t-butyl-peroxy) hexene as Varox DBPH-50 from the R. T. Vanderbilt company.

The EPDM-based rubber compositions were vulcanized in a suitable mold by heating for about 10 minutes to a temperature of about 170° C.

Various physical properties of the vulcanized rubber compositions are shown in the following Table 2.

The TS1, T90 and Maximum Torque values were determined via an MDR 2000 instrument at 165° C.

The 300 percent modulus, tensile strength and elongation were determined utilizing a dumbbell specimen of the rubber sample.

The Tan. delta was determined via a Flexsys Rubber Process Analyzer (RPA) 2000 with which a sample is cured for 10 minutes to a temperature of 175° C. at 0.7% elongation. The Tan. delta is determined at a 5 percent strain at 11 Hz and 100° C. A more detailed description of the RPA 2000 and its use may be found in: *Rubber World*, June 1992 by H. A. Powlowski et al and *Rubber & Plastics News*, Apr. 26 and May 10, 1993 by J. S. Dick, et al.

TABLE 2

| Property | Sample A Control | Sample B | Sample C | Sample D |
|---|---|---|---|---|
| MDR 2000 @ 165° C. | | | | |
| Ts$_1$ (min.) | 1.23 | 1.38 | 0.87 | 1.36 |
| T$_{90}$ (min) | 22.46 | 16.66 | 19.4 | 16.67 |
| Max Torque (dNm) | 11.73 | 9.46 | 13.47 | 11.58 |
| Delta Torque | 10.67 | 8.40 | 12.41 | 10.54 |
| UTS Data, 20 minutes at 175° C. | | | | |
| 300% Modulus, MPa | 6.44 | 3.93 | — | 5.96 |
| Tensile Strength, MPa | 6.83 | 4.64 | 7.58 | 6.77 |

TABLE 2-continued

| Property | Sample A Control | Sample B | Sample C | Sample D |
|---|---|---|---|---|
| Elongation, % | 375 | 696 | 267 | 424 |
| RPA Data, 10 minutes at 175° C. and 1.677 Hz strain | | | | |
| Tan. delta (100° C.) | 0.150 | 0.169 | 0.136 | 0.146 |

The $Ts_1$ value is a measure of processing safety. It represents the time for the torque value of the sample specimen to rise one unit of torque during cure.

The $T_{90}$ value is a measure of the time for the sample specimen to reach a 90 percent state of cure.

The maximum torque value is a measure of maximum torque experienced by the sample specimen during cure.

The delta torque is the difference between the above maximum torque and a minimum torque experienced during cure.

The Tan. delta value is a measure of hysteresis of the sample specimen, or ratio of loss modulus to storage modulus and is a term well known to those having skill in such art.

It can readily be seen from Table 2 that Sample B, which used the peroxide cure with the sulfur co-agent and without the acrylate co-agent, as compared to Control Sample A which used only the peroxide cure, exhibited what is considered to be a good scorch time ($Ts_1$) of about 1.38 minutes and an acceptable 90 percent cure time of 16.66 minutes.

However, the state of cure of Sample B, as represented by the maximum torque value, is significantly reduced by about 19 percent and the critical properties of 300% modulus, tensile strength and Tan. delta are degraded.

It can also be readily seen from Table 2 that Sample C, which used the peroxide cure with the acrylate co-agent and without the sulfur co-agent, as compared to Control Sample A which used only the peroxide cure, exhibited what is considered to be an unsatisfactory scorch time ($Ts_1$) of 0.87 minutes and an acceptable 90 percent cure time of 19.4 minutes.

The state of cure of Sample C, as represented by the maximum torque and Tan. Delta values of 13.47 and 0.136, respectively, are considered herein as being satisfactory as well as the indicated tensile strength, although the ultimate elongation property is somewhat reduced.

In particular, the state of cure (maximum torque) of Sample C was significantly improved over that of Sample B which only used the sulfur co-agent, however, as related above, the processing safety (Ts1) is significantly reduced by 29 percent as compared to Control Sample A and 36 percent as compared to Sample D.

It can further be readily seen from Table 2 that Sample D, which used the peroxide cure with the combination of sulfur and acrylate co-agents produced synergistic results as compared to Control Sample A which used only the peroxide cure.

In particular, a satisfactory scorch time ($Ts_1$) of 1.36 was observed and an acceptable 90 percent cure time of 16.67 minutes was also observed.

The state of cure of Sample D, as represented by the maximum torque value of 11.58 is considered herein as being satisfactory and an improvement over that of Sample B which used only the sulfur co-agent.

The tensile strength of Sample D was improved over that of Sample B which used only the sulfur co-agent.

The tensile strength and ultimate elongation properties of Sample D were equal or improved over that of Sample C which used only the acrylate co-agent.

The Tan. delta value for Sample D is better (lower) than such values for all the Samples except for Sample C. This is expected because Sample C simply has a higher state of cure.

Accordingly, and in summary, it is seen that the use of a peroxide curative, together with a combination of sulfur and acrylate co-agents as represented by Sample D, acted in a synergistic manner as compared to using either the sulfur agent or the acrylate agent alone, by providing a better balance of the important EPDM-based rubber properties, namely the processing safety ($Ts_1$), cure time ($T_{90}$), and cure state (maximum torque), than the Control Sample A in which the combination of sulfur and acrylate co-agents was not used, Sample B in which only the sulfur co-agent was used and Sample C in which only the acrylate co-agent was used.

In particular, in Table 2 it can readily be observed that while inclusion of sulfur co-agent in a peroxide cure system for an EPDM rubber (Sample B) has resulted in a relatively short cure time ($T_{90}$) and an acceptable scorch (processing safety) as evidenced by the $Ts_1$ values, a relatively low state of cure was obtained as evidenced by reduced maximum torque and 300% modulus values for the resulting, cured, rubber composition as compared to a curing of the EPDM with the peroxide without such co-agent.

In particular, from Table 2 it can readily be observed that while inclusion of an acrylate co-agent in a peroxide cure system for an EPDM-based rubber (Sample C) resulted in a good and acceptable cure time ($T_{90}$), its processing safety ($Ts_1$) was significantly reduced.

In particular, it is concluded from Table 2 that use of a combination of sulfur and acrylate co-agents in a peroxide cure system for an EPDM rubber (Sample D) demonstrates a synergistic interaction between the two co-agents when used with the peroxide curing of the EPDM-based rubber composition. The resultant, indicated properties are not seen to be additive and are, thus, considered as being synergistic in nature. The combination of co-agents thereby permits an adjustment of a balance between increasing processing safety and reducing cure time while maintaining various desirable physical properties.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a composition which comprises
  (A) blending, and based upon 100 phr of elastomer,
    (1) elastomers comprised of
      (a) about 10 to about 100 phr of at least one low unsaturation EPDM rubber or saturated EPR rubber and
      (b) from zero to about 90 phr of at least one high unsaturation rubber selected from the group consisting of homopolymers and copolymers of conjugated dienes and copolymers of at least one conjugated diene with a vinyl aromatic compound selected from styrene and alpha-methylstyrene;
    (2) about 20 to about 200 phr of particulate reinforcement selected from at least one of the group consisting of clay, carbon black and precipitated silica;

(3) about 0.5 to about 10 phr of peroxide curative for said low unsaturation rubber(s);

(4) about 0.25 to about 10 phr of acrylate co-curing agent which is homogeneously dispersed within said elastomer(s); wherein said acrylate is selected from at least one of the group consisting of monoacrylate, diacrylate, triacrylate, tetraacrylate, pentaacrylate and hexaacrylate co-curing agents for peroxide curative, and mixtures thereof; and (5) about 0.05 to about 0.6 phr of elemental sulfur co-curing agent; wherein the weight ratio of said sulfur and acrylate co-curing agents to said peroxide curative is in a range of about 1/1 to about 1/30 and the weight ratio of said acrylate co-curing agent to said sulfur co-curing agent is in a range of about 2/1 to about 200/1, followed by (B) heating and curing the prepared composition at a temperature in a range of about 150° C. to about 180° C.;

wherein said EPR is a copolymer of ethylene and propylene;

wherein said EPDM is an ethylene/propylene/non-conjugated diene terpolymer and wherein said non-conjugated diene is selected from at least one of the group consisting of dicyclopentadiene, 4-hexadiene and ethylidene norbornene;

wherein said peroxide is selected from at least one of dicumyl peroxide, methyl-2,5-di(t-butyl-peroxy) hexane, dibenzoyl peroxide and 2,4-dichlorobenzyl peroxide; and wherein said acrylate is selected from at least one of stearyl acrylate, stearyl methacrylate, lauryl acrylate, lauryl methacrylate, isodecyl methacrylate, 1,4-butanediol diacrylate, 1,4-butanediol dimethacrylate, tetraethylene glycol diacrylate, ethoxylated Bisphenol-A diacrylate, ethoxylated Bisphenol-A dimethacrylate, trimethyl propane triacrylate, trimethyl propane trimethacrylate, glycerol triacrylate, glycerol trimethacrylate, trimethyl ethane triacrylate, propoxylated glycerol triacrylate, ethoxylated trimetholpropane triacrylate, pentaerythreitol tetraacrylate, pentaerythritol tetramethacrylate, di-trimethylolpropane tetraacrylate, ethoxylated pentaerythritol tetraacrylate, dipentaerythritol pentaacrylate and pentaacrylate ester.

2. The process of claim 1 wherein said elastomer is an EPDM rubber to the exclusion of an EPR rubber.

3. The process of claim 1 wherein said elastomer is EPR rubber to the exclusion of an EPDM rubber.

4. The process of claim 1 wherein said elastomers are comprised of from about 40 to about 80 phr of at least one of the group consisting of EPDM and EPR and, correspondingly, about 20 to about 60 phr of at least one high unsaturation rubber.

5. The process of claim 1 wherein said high unsaturation rubber is selected from at least one of the group consisting of cis 1,4-polyisoprene natural rubber, synthetic cis 1,4-polyisoprene, cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

6. The process of claim 1 wherein said reinforcement is clay.

7. The process of claim 1 wherein said reinforcement is precipitated silica.

8. The process of claim 1 wherein said reinforcement is carbon black.

9. An article prepared by the process of claim 1.

10. An article having at least one component prepared by the process of claim 1.

11. An article having at least one component prepared by the process of claim 3.

12. An article having at least one component prepared by the process of claim 4.

13. An article having at least one component prepared by the process of claim 5.

14. An article having at least one component prepared by the process of claim 6.

15. An article having at least one component prepared by the process of claim 7.

16. An article having at least one component prepared by the process of claim 8.

17. The article of claim 9 as an industrial article selected from at least one belts, hoses, seals and gaskets.

18. The article of claim 10 as an industrial article selected from at least one of belts, hoses, seals and gaskets.

19. The article of claim 11 as an industrial article selected from at least one of belts, hoses, seals and gaskets.

20. The article of claim 12 as an industrial article selected from at least one of belts, hoses, seals and gaskets.

21. The article of claim 13 as an industrial article selected from at least one belts, hoses, seals and gaskets.

22. The article of claim 14 as an industrial article selected from at least one of belts and hoses.

23. The article of claim 15 as an industrial article selected from at least one belts and hoses.

24. The article of claim 16 as an industrial article selected from at least one of belts and hoses.

25. An uncured rubber composition is provided which is comprised of, based upon 100 phr of elastomer(s):

(1) 100 parts by weight (phr) of uncrosslinked elastomer(s) comprised of (a) about 10 to about 100 phr of low unsaturation rubber or saturated rubber selected from at least one of EPDM rubber and EPM rubber and (b) about zero to about 90 phr of at least one diene-based rubber selected from homopolymers and copolymers of conjugated dienes and copolymers of at least one conjugated diene with a vinyl aromatic compound selected from styrene and alpha-methylstyrene;

(2) about 20 to about 200 phr of particulate reinforcement selected from at least one of clay, carbon black and precipitated silica;

(3) from about 0.5 to about 10 phr of at least one peroxide curative for said EPDM and EPR;

(4) from about 0.25 to about 6 phr of an acrylate compound as a co-curing agent which is homogeneously dispersed within said elastomer(s); wherein said acrylate is selected from at least one of monoacrylate, diacrylate, triacrylate, tetraacrylate, pentaacrylate and hexaacrylate co-curing agents for peroxide curative, and mixtures thereof; and (5) from about 0.05 to about 0.6 phr of elemental sulfur co-cure agent;

wherein the weight ratio of said sulfur and acrylate co-curing agents to said peroxide curative is in a range of about 1/1 to about 1/30 and the weight ratio of acrylate co-curing agent to said sulfur co-curing agent is an a range of about 2/1 to about 200/1; and wherein said EPR is a copolymer of ethylene and propylene;

wherein said EPDM is an ethylene/propylene/non-conjugated diene terpolymer and wherein said non-conjugated diene is selected from at least one of the group consisting of dicyclopentadiene, 4-hexadiene and ethylidene norbornene;

wherein said peroxide is selected from at least one of dicumyl peroxide, methyl-2,5-di(t-butyl-peroxy) hexane, dibenzoyl peroxide and 2,4-dichlorobenzyl peroxide; and wherein said acrylate is selected from at least one of stearyl acrylate, stearyl methacrylate, lauryl acrylate, lauryl methacrylate, isodecyl methacrylate, 1,4-butanediol diacrylate, 1,4-butanediol dimethacrylate, tetraethylene glycol diacrylate, ethoxylated Bisphenol-A diacrylate, ethoxylated Bisphenol-A dimethacrylate, trimethyl propane triacrylate, trimethyl propane trimethacrylate, glycerol triacrylate, glycerol trimethacrylate, trimethyl ethane triacrylate, propoxylated glycerol triacrylate, ethoxylated trimetholpropane triacrylate, pentaerythreitol tetraacrylate, pentaerythritol tetramethacrylate, di-trimethylolpropane tertraacrylate, ethoxylated pentaerythritol tetraacrylate, dipentaerythritol pentaacrylate and pentaacrylate ester.

26. The rubber composition of claim 25 cured by heating to a temperature in a range of about 150° C. to about 180° C.

27. The rubber composition of claim 26 wherein said peroxide is selected from the group consisting of dicumyl peroxides, diacyl peroxides, acetyl alkylsulfonyl peroxides, dialkyl peroxydicarbonates, tert-alkyl peroxyesters, α,α'-(tert-alkylperoxy)ketals, dialkyl peroxides, di-tert-alkyl peroxides and tert-alkyl hydroperoxides and said acrylate is selected from the group consisting of stearyl acrylate, stearyl methacrylate lauryl acrylate, lauryl methacrylate, isodecyl methacrylate, 1,4-butanediol diacrylate, 1,4-butanediol dimethacrylate, tetraethylene glycol diacrylate, ethoxylated Bisphenol-A diacrylate, ethoxylated Bisphenol-A dimethacrylate, trimethyl propane trimethacrylate, glycerol triacrylate, glycerol trimethacrylate, trimethyl ethane triacrylate, propoxylated glycerol triacrylate, ethoxylated trimetholpropane triacrylate, pentaerythreitol tetraacrylate, pentaerythreitol tetramethacryalte, di-trimethylolpropane tetraacrylate, ethoxylated pentaerythreitol tetraacrylate, dipentaerythritol pentaacrylate and pentaacrylate ester.

28. The rubber composition of claim 27 wherein said peroxide is selected from the group consisting of dicumyl peroxide, methyl-2,5-di(t-butyl-peroxy)hexane, dibenzoyl peroxide and 2,4-dichlorobenzyl peroxide.

29. The rubber composition of claim 28 wherein said elastomer is an EPDM rubber to the exclusion of an EPR rubber.

30. The rubber composition of claim 28 wherein said elastomer is EPR rubber to the exclusion of an EPDM rubber.

31. The rubber composition of claim 28 wherein said EPDM is an ethylene/propylene/non-conjugated diene terpolymer and wherein said non-conjugated diene is selected from at least one of dicyclopentadiene, 4-hexadiene and ethylidene norbornene.

32. The rubber composition of claim 28 wherein said elastomers are comprised of from about 40 to about 80 phr of at least one of EPDM and EPR and, correspondingly, about 20 to about 60 phr of at least one high unsaturation rubber.

33. The rubber composition of claim 32 wherein said high unsaturation rubber is selected from at least one of the group consisting of cis 1,4-polyisoprene natural rubber, synthetic cis 1,4-polyisoprene, cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

34. The rubber composition of claim 28 wherein said reinforcement is clay.

35. The rubber composition of claim 28 wherein said reinforcement is precipitated silica.

36. The rubber composition of claim 28 wherein said reinforcement is carbon black.

37. An article having at least one component of the rubber composition of claim 27.

38. An article having at least one component of the rubber composition of claim 27.

39. An article having at least one component of the rubber composition of claim 28.

40. An article having at least one component of the rubber composition of claim 29.

41. An article having at least one component of the rubber composition of claim 30.

42. An article having at least one component of the rubber composition of claim 31.

43. An article having at least one component of the rubber composition of claim 32.

44. An article having at least one component of the rubber composition of claim 33.

45. An article having at least one component of the rubber composition of claim 34.

46. An article having at least one component of the rubber composition of claim 35.

47. An article having at least one component of the rubber composition of claim 36.

48. The article of claim 37 as an industrial article selected from at least one belts, hoses, seals and gaskets.

49. The article of claim 38 as an industrial article selected from at least one of belts, hoses, seals and gaskets.

50. The article of claim 39 as an industrial article selected from at least one belts, hoses, seals and gaskets.

51. The article of claim 40 as an industrial article selected from at least one of belts, hoses, seals and gaskets.

52. The article of claim 41 as an industrial article selected from at least one of belts, hoses, seals and gaskets.

53. The article of claim 42 as an industrial article selected from at least one belts, hoses, seals and gaskets.

54. The article of claim 43 as an industrial article selected from at least one of belts, hoses, seals and gaskets.

55. The article of claim 44 as an industrial article selected from at least one belts and hoses.

56. The article of claim 45 as an industrial article selected from at least one of belts and hoses.

57. The article of claim 46 as an industrial article selected from at least one of belts and hoses.

* * * * *